Feb. 23, 1960 F. M. JONES 2,926,005
THERMOSTAT AND TEMPERATURE CONTROL SYSTEM
Filed Dec. 2, 1954
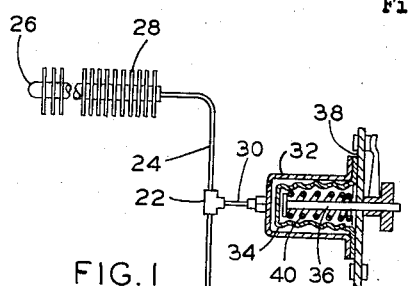
FIG. 1
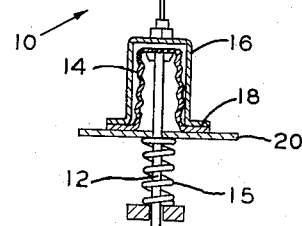
FIG. 2
FIG. 3
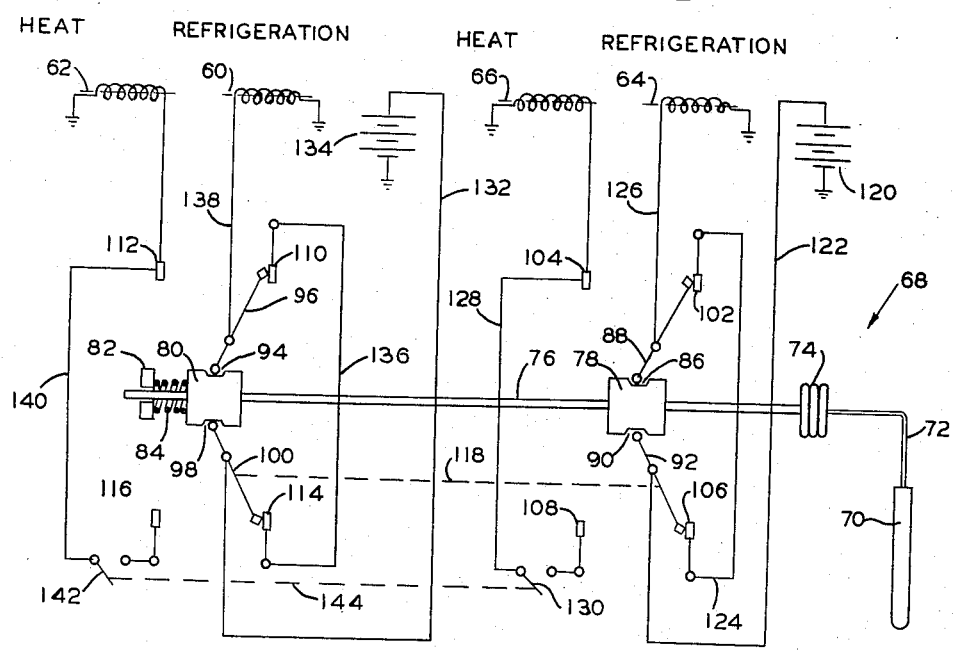
FIG. 4
INVENTOR.
FREDERICK M. JONES
BY
Whiteley and Caine
ATTORNEYS 2,926,005

THERMOSTAT AND TEMPERATURE CONTROL SYSTEM

Frederick M. Jones, Minneapolis, Minn., assignor to Thermo King Corporation, Minneapolis, Minn., a corporation of Minnesota Application December 2, 1954, Serial No. 472,573

5 Claims. (Cl. 257—287)

This invention relates to improvements in a temperature control system. In general the invention relates to mechanisms for maintaining a substantially constant temperature in a controlled space. More particularly, the invention is concerned with vehicles in which perishable products are transported and must be maintained at a desired temperature throughout the extent of the journey by mechanical means capable of maintaining a substantially constant temperature by either cooling or heating the space in which the products are stored. Still further, the invention is concerned with a control system for operating means for alternately cooling or heating a space as necessity may require, to maintain a substantially constant temperature therein despite variations in ambient temperatures.

This application is a continuation in part of my co-pending application Serial No. 136,952, now Patent 2,696,086, dated December 7, 1954.

In my aforesaid patent there is disclosed a vehicle used for storage and transportation of perishable foodstuffs, through the maintenance of a pre-selected constant temperature which will vary according to the products stored and transported, and incorporating a mechanical system that is capable of alternately cooling or heating the storage space as may be necessary to maintain the constant temperature. The vehicle is known as an "all purpose" car and may be used on the one hand for produce and similar perishables requiring a relatively mild constant temperature such as in the range of 30°–40° F., or the vehicle may be used for the storage and transportation of severely frozen foods requiring the maintenance of a constant temperature of substantially 0° F. to as low as minus 10° F. In many instances the desired constant temperature is relatively critical, particularly in the low range of temperatures used in the storing and transportation of fresh produce. For example, choice grades of eating apples should be maintained at a temperature of substantially 31° plus or minus 1°. If the fruit is cooled below 29° F. it will freeze, and if the temperature is permitted to rise for any substantial period of time to a point above 35° F., decomposition sets in and in time the fruit becomes soft and pulpy. In the normal course of their use, these vehicles are moved in transcontinental service and will pass from relatively warm climates where fruits and vegetables are grown to colder climates where the consumer markets are located. On the other hand, in the instance of meats and dairy products, the vehicles will pass from or through relatively cold climates, and in some instances into warmer climates where the market is situated. Under these conditions it is not unusual for the air conditioning system to have to reverse its function one or more times during a single journey in order to maintain a constant temperature in the storage space. Moreover, during periods of cleaning and repair, and particularly in loading, the storage space may be subjected to extreme variations in temperature to such an extent that the calibration of a thermostat might be wholly inaccurate. Still further, the products which are loaded into the storage space may be at a temperature, at the time of loading, which is at substantial variance with the optimum transit temperature, and one of the highly important advantages of these vehicles and their equipment is that both the product and the space conditions are brought to an optimum condition at the outset of the transit period and then maintained at that condition until the end of the transit period. For example, fruits and vegetables containing field heat can be loaded in the vehicle, and the arrangement is such that a direct blast of air is passed over the products until they are properly pre-cooled, whereafter the direct contact between the cooled air and the products is terminated and an envelope of air at the proper temperature is maintained about the storage chamber to prevent excessive dehydration of the product. Arrangements such as this require accurate temperature control not generally found in thermostats used in stationary structures.

Because vehicles of the type mentioned are relatively unattended for several days, and must maintain accurate temperature control despite wide variations in ambient temperatures, and must necessarily be subjected to considerable shock and movement, the control thermostat must be relatively simple and yet highly accurate since the setting and control thereof is not done by experts in the field but rather by persons engaged in the transportation industry or by employees of the shipper who are not skilled in the handling of delicate instruments.

In the present invention I have provided a simple control system including a single thermostat that operates suitable switching mechanisms for energizing portions of the mechanical equipment, and containing suitable safeguards against undesirable operation of the system or mechanical equipment when such operation is not desired. More particularly, when the vehicle is used in storing and transporting frozen foods wherein the upper limit in temperature is critical, the system is capable of adjustment to prevent heating the space if the temperature of the product on loading was below the lower limits of the thermostat setting, or a drop in ambient temperature occurs of sufficient magnitude that might otherwise cause the space temperature to descend to a point where the system would call for heat.

Because the railway vehicle described in my aforesaid application for patent is or may be provided with two independent air conditioning units arranged either for simultaneous or sequential operation, the control system is arranged to provide for the operation of both units when necessary to obtain a desired temperature, or just one of the units to maintain the desired temperature.

An object is to provide in combination with heat exchange means adapted for alternately cooling and heating a storage space, a temperature responsive control system for properly controlling the operation of the heat exchange means to maintain a substantially constant temperature within the storage space despite variations in ambient temperature.

Another object is to provide in combination with heat exchange means adapted for alternately cooling and heating a storage space, a temperature responsive control system for operating the heat exchange means in such a manner as to maintain a predetermined minimum temperature in the storage space and which will preclude heating the space in the event the temperature therein descends below the predetermined minimum temperature.

A further object is to provide in combination with two independent heat exchange means adapted to simultaneously or sequentially cool and heat a storage space to maintain a constant temperature therein, a temperature responsive control system connected to the heat exchange means in such a manner as to cause the two units to operate either simultaneously or sequentially to maintain a substantially constant temperature in the storage space.

Other and further objects may become apparent from the following description and claims, and in the appended drawings in which:

Fig. 1 is an elevation of a thermostat with certain parts broken away to reduce the size thereof, and other portions shown in section to show interior construction;

Fig. 2 is a front elevation of the manually settable portion of the thermostat shown in Fig. 1;

Fig. 3 is a detail view taken on line 3—3 of Fig. 2; and,

Fig. 4 is a diagrammatic showing of a temperature responsive electrical control system for controlling the temperature within a storage space.

Having reference to the several figures of the drawing, the invention will now be described in detail. Referring first to Fig. 1, general reference numeral 10 indicates in its entirety one form of thermostat for operating a switching mechanism for controlling the operation of a temperature changing means. A rod 12 constituting the driven member is secured at its inner end to the inner sealed end of a bellows 14 and operates against a compression spring 15. Bellows 14 is mounted within a casing 16 whose lower flanged portion 18 seals the open end of the bellows 14 to a plate 20. Extending from the upper end of casing 16 and through the opposite sides of T 22 is a conduit 24 whose other end is secured to one end of a sealed thermostatic bulb 26. Bulb 26 is of substantial length and capacity and is surrounded by a plurality of fins 28. Within the bulb 26, conduit 24 and casing 16, and on the outer surface of bellows 14 is a liquid which constitutes the thermostatic medium and is a liquid having a relatively constant viscosity, such as kerosene or the like. The relationship of the size of bulb 26 and bellows 14 is critical in that there is a very large ratio between the size of bulb 26 and the diameter of bellows 14, so that a relatively slight increase or decrease of volume of the thermostatic liquid will effect a substantial movement of the bellows, and through the bellows to the rod 12.

Extending from the center of T 22 is a conduit 30 which is joined to a casing 32. Within casing 32 is a bellows 34 having a threaded rod 36 secured to its inner end. The outer open ends of casing 32 and bellows 34 are sealed to a plate 38. Within bellows 34, in surrounding relationship to rod 36 and extending between the inner end of the bellows and plate 38 is a heavy coil spring 40. Surrounding plate 38, and best seen in Fig. 2, is a larger plate 42 which is spaced from plate 38 to form a circular slot indicated at 44. Mounted on the outer end of rod 36 and seen in Figs. 1 and 2 is a control knob 46 which has secured thereto a resilient pointer 48. The pointer 48 is adapted to engage in a grooved portion 50 of any one of a plurality of adjustable stops 52, one of which is shown in cross section in Fig. 3 and consists of a lower portion 54 and an upper portion 56, which are secured with relation to each other by a screw or bolt 58.

It is believed that the description and showing of the thermostat is such that anyone skilled in the art would fully comprehend its operation. Briefly, the temperature sensitive bulb 26 is located in the space whose temperature is to be controlled, and the rod 12, which operates against the pressure of spring 15, extends to the switching mechanism that controls the temperature changing mechanism. In operation the closed system including bulb 26, conduit 24, and casings 16 and 32 are filled with the thermostatic liquid. Casing 32 and bellows 34 represent a variable reservoir for the excess liquid, and by rotation of the knob 67, rod 36 is capable of changing the volume of bellows 34. Accordingly the thermostat is calibrated for the different temperatures to be maintained within the controlled space, and the several stops 52 would be adjusted to the positions corresponding to the excess liquid present in casing 32 at the predetermined temperatures. Assuming the thermostat to be pre-set at any chosen temperature, if the temperature of the enclosed space exceeds the predetermined temperature, the volume of liquid in the system will expand and after having driven bellows 14 and rod 12 to the full extent of movement permissible, the remaining liquid would exert pressure against bellows 34 and the coil spring 40 therein, thus allowing for expansion of the thermostatic liquid without destruction of any of the parts.

Referring now to Fig. 4, is diagrammatically illustrated a control system for operating mechanical means adapted to alternately cool or heat the atmosphere within a controlled space. The mechanical equipment consists of two independent units, each of which is adapted to alternately supply refrigeration or heat, as required to the controlled space. In my aforesaid Patent 2,696,086 these units consist essentially of engine driven refrigerant compressors and closed refrigerant systems. Refrigeration is supplied through the circulation of a refrigerant medium through an evaporator heat exchanger that is in heat exchange relationship with the controlled space. Heat is supplied to the controlled space by reversing or modifying the refrigerant cycle, and examples of such systems are disclosed in my prior Patents No. 2,509,099 and No. 2,666,298. Having reference to the drawings herein, unit "A" is provided with a relay 60 that is adapted to motorize a refrigerant compressor to provide refrigeration. A relay 62 is also provided in the circuit to energize a valve to reverse or modify the refrigerant circuit. It should be understood, however, that the system is not necessarily restricted to my prior disclosures and relay 60 may energize any form of motorized means to provide refrigeration, and relay 62 may energize any conventional means which will supply heat and at the same time cut off the source of refrigeration supplied by relay 60. Unit "B" is independent of unit "A," but the circuit shows that the two units may operate concomitantly when one unit is incapable of furnishing the needs of the space. Unit "B" is provided with a first relay 64 for motorizing a refrigerant compressor, and a second relay 66 for energizing a source of heat in the same manner as has been previously disclosed with respect to relays 60 and 62.

The control system disclosed in Fig. 4 is operated by a thermostat indicated generally at 68 and consisting of a thermostatic bulb 70 connected by a conduit 72 to a pressure motor 74. Extending from the left hand side of pressure motor 74 is a driven rod 76 that carries a pair of blocks 78 and 80. The outer end of the driven member 76 is supported in a bearing 82, and between bearing 82 and block 80 is a compression spring 84 intended to maintain the rod or driven member 76 and its cooperating parts against the pressure motor 74.

Block 78 is provided on one side with a small recess 86 within which is pivotally mounted a switch blade 88. On the other side of the block 78 is a larger recess 90 within which is pivotally mounted a switch blade 92. Block 80 is provided with a recess 94 within which is pivotally mounted a switch blade 96. Block 80 is also provided with a larger recess 98 on the opposite side from recess 94, and within this latter recess is pivotally mounted a switch blade 100. Switch blade 88 is adapted to move between a pair of contacts 102, 104. Switch blade 92 is adapted to move between a pair of contacts 106, 108. Switch blade 96 is adapted to move between a pair of contacts 110, 112. Switch blade 100 is adapted to move between a pair of contacts 114, 116. The switch blades 92 and 100 are joined by a mechanical linkage 118 which is effective to maintain both of these respective switches in the same over center position as regards their opposite contacts.

The various contacts and switches of unit "B" are joined in a circuit which is designated as follows. A source of power indicated by battery 120 has a conductor 122 extending to switch blade 92. A conductor 124 joins contacts 102, 106. A conductor 126 extends from switch blade 88 to relay 64 and thence to ground. A conductor 128 containing a movable switch blade 130 extends between contacts 108, 104 and relay 66 and thence to ground.

The circuit for unit "A" will now be described. From a source of power designated by battery 134 a conductor 132 joins switch blade 100. A conductor 136 extends between contacts 110 and 114. A conductor 138 extends from switch blade 96 to relay 60. A conductor 140 which contains a movable switch 142 joins contacts 116, 112 and relay 62 and thence to ground. A mechanical linkage 144 extends between switch blades 130 and 142 so as to assure that both of these switches will be in the same position relative to their respective circuits.

With the parts in the position shown in Fig. 4, the space surrounding thermostatic bulb 70 is above a predetermined limit and therefore motor 74 has moved the driven rod 76 to the left against the resilience of spring 84. Switches 142, 130 are in an open position to assure against heating, and the circuit is now arranged to provide refrigeration to the controlled space with the aid of units "A" and "B" operating simultaneously. The circuit for unit "B" will be traced: From the battery 120 current is flowing through conductor 122 to switch blade 92 and thence through contact 106, conductor 124, contact 102, switch blade 88, conductor 126 to relay 64 and thence to ground. This will energize relay 64 and the refrigerant compressor will supply a cooling medium. Unit "A" will be similarly energized by power from battery 134 through conductor 132 to switch blade 100, contact 114, conductor 136, contact 110, switch blade 96, and conductor 138 to relay 60 and thence to ground. With both units in operation the temperature in the controlled space will descend and rod 76 will move to the right, as shown in the drawing. Block 78 is related in position to block 80 so that the first increment of movement of rod 76 will cause switch 88 to move with a snap action to contact 104, thereby breaking the circuit between battery 120 and relay 64 so that unit "B" will shut down, but unit "A" continues to operate. Thereafter on a further drop in temperature block 80 will have been moved by rod 76 to the right and switch 96 will move into engagement with contact 112, thereby breaking the circuit to relay 60 and shutting down unit "A." In the event that the temperature in the controlled space rises, causing rod 76 to again move to the left, switch 96 will be moved through an over center movement from contact 112 to contact 110 to again energize unit "A," and this unit will operate in this manner intermittently to maintain the space in a cooled condition.

Assuming now a second condition which might likely occur in the event the product being transported is severely frozen foods whose temperature on loading in the controlled space might be lower than the predetermined setting of the thermostat, or the ambient temperatures might descend below the predetermined setting of the system. Under these conditions the thermostat 68 might cause rod 76 to move to the right beyond a point where switch blades 88 and 96 are in engagement with contacts 104, 112. If this should occur, switch blades 92 and 100, being linked together but provided with a limited degree of lost motion with respect to blocks 78 and 80 by virtue of the larger recesses 90 and 98, would nonetheless move through an overcenter position to engage contacts 108, 116. Under these conditions there would be the likelihood of energizing relays 62 and 66, but since switches 142, 130 are in an open position, such action is not possible. Therefore switches 142, 130 have been placed in the respective circuits and under the control of a linkage 144 to prevent heating where the product is severely frozen foods and the shipper is not concerned with how low the temperature may descend since a lowering temperature would have no effect upon frozen foods.

Assuming now still another condition where the product being shipped must be maintained at a relatively constant temperature, and ambient temperatures are subject to considerable variation to the extent that some heating might be required. Under these conditions switches 130, 142 would be closed, and the mechanism would operate in the same manner as described above. Assuming switches 88 and 96 are in engagement with contacts 104, 112, neither unit is providing refrigeration to the space, but with a further drop in temperature switches 92 and 100 would simultaneously move into engagement with contacts 108, 116. When this occurs a new circuit for each of the units would be established, and the circuit for unit "B" will now be traced. From battery 120 current will flow through conductor 122 to switch blade 92 and thence through contact 108, switch 130, conductor 128 to contact 104, and relay 66, and also through switch blade 88 and conductor 126 to relay 64. This would energize the refrigerant compressor, and also relay 66 which would provide heat instead of refrigeration to the enclosed space. The circuit for unit "A" may be similarly traced from battery 134 through conductor 132, switch blade 100, contact 116, conductor 140, including switch 142, to contact 112 and relay 62 as well as switch 96 and conductor 138 to relay 60, and both units provide heat.

As the temperature in the space rises, rod 76 will move to the left and switch 88 will snap from contact 104 to contact 102, thereby terminating the operation of unit "B." Thereafter, on a further rise in temperature block 80 will cause switch 96 to snap from contact 112 to contact 110, thereby terminating the operation of unit "A." If the temperature continues to rise, rod 76 will then cause the two switches 92 and 100, joined by link 118, to engage contacts 106 and 114, thereby prepare the two units to supply refrigeration in the manner previously disclosed.

A highly important advantage of the invention is in the provision of a single thermostat in a temperature responsive system capable of alternately energizing a cooling and a heating system for maintaining a substantially constant temperature within an enclosed space, and precludes the possibility of both heating and cooling the space at the same time, which has been a handicap in the past where it has been customary to use two independent thermostats for the purposes set forth.

As the invention is subject to minor changes that are within the skill of ordinary mechanics, the invention is not limited to the extent of the disclosure, but is only limited to the extent of the appended claims.

I claim:

1. In a system for maintaining a substantially constant temperature in an enclosed space embodying a first electromagnetic control device adapted to control a mechanism capable of reducing the temperature in said space, a second electromagnetic control device adapted to control a mechanism capable of raising the temperature in said space, a circuit including said first and second electromagnetic control devices, first switching means in said circuit which when operative energizes said first control device to reduce the temperature in said space, second switching means in said circuit which when operative concomitantly with first switching means is adapted to energize said second control device to raise the temperature in said space, and temperature responsive means consisting of a single thermostat responsive to the space temperature and operably connected to said switching means for controlling said control devices to maintain a substantially constant temperature in said space.

2. In a system for conditioning the atmosphere in an enclosed space embodying means adapted to alternately heat or cool said space, means for controlling said first named means to maintain a substantially constant temperature in said space, comprising a first electromagnetic device operably associated with said first named means and when energized initiates operation of said first named means in such a manner as to normally cool said space, a second electromagnetic device operably associated with said first named means and when energized concomitantly with said first electromagnetic device effects heating of said space, a circuit including both of said electromagnetic devices, a first switch in said circuit which when closed energizes said first electromagnetic device, a second switch in said circuit which when closed energizes said second electromagnetic device concomitantly with said first electromagnetic device, and temperature responsive means consisting of a single thermostat responsive to the temperature in said space and operably associated with said switches in such a manner as to maintain a substantially constant temperature in said space.

3. In a system for conditioning the atmosphere in an enclosed space embodying means adapted to alternately heat or cool said space, means for controlling said first named means comprising a first electromagnetic device operably associated with first said means and when energized initiates operation of said first named means in such a manner as to normally effect cooling of said space, a second electromagnetic device operably associated with said first named means and when energized reverses the function of said first named means to effect heating of said space, a circuit including both of said electromagnetic devices and two pair of spaced contacts, a pair of switches in said circuit each movable between a respective pair of contacts for controlling the energization of both of said electromagnetic devices, and temperature responsive means consisting of a single thermostat responsive to the temperature of said space for sequentially controlling said switches in such a manner as to maintain a substantially constant temperature in said space.

4. In a system for conditioning the atmosphere in an enclosed space embodying means adapted to alternately heat or cool said space, means for controlling said first named means comprising a two positioned control device operably connected to said first named means and when moved between its opposite positions effects alternate heating and cooling of said space, a circuit comprising an electrically operable portion of said control device and two pairs of spaced contacts with each contact of one pair connected in parallel with a respective contact of the other pair, a switch for each pair of contacts, and temperature responsive means consisting of a single thermostat responsive to the temperature within said space and operably connected to both of said switches to consecutively move both of said switches alternately between their respective pairs of contacts to alternately energize and de-energize said control device to heat or cool said space.

5. In a system for conditioning the atmosphere in an enclosed space embodying means adapted to alternately heat or cool said space, means for automatically controlling said first named means to maintain a substantially constant temperature in said space comprising a first electromagnetic device operably associated with said first named means and when energized initiates operation of said first named means in such a manner as to normally cool said space, a second electromagnetic device operably associated with said first named means and adapted for movement between alternate positions and when in one of its positions effects heating of said space, a circuit including both of said electromagnetic devices, a first switch in said circuit which when closed energizes said first electromagnetic device, a second switch in said circuit which when closed energizes said second electromagnetic device, temperature responsive means consisting of a single thermostat responsive to the temperature in said space and having a consecutive movement connection with said switches to automatically maintain a substantially constant temperature in said space, and a manual switch in said circuit with the second electromagnetic device and when open prevents operation of said second electromagnetic device when the second switch is closed to thereby prevent heating the space when said thermostat directs such action.

References Cited in the file of this patent
UNITED STATES PATENTS

| | | |
|---|---|---|
| 1,988,495 | Hulse et al. | Jan. 22, 1935 |
| 1,998,534 | Dautel | Apr. 23, 1935 |
| 2,100,037 | Sandvoss | Nov. 23, 1937 |
| 2,229,612 | Pearce | Jan. 21, 1941 |
| 2,342,328 | Carrier | Feb. 22, 1944 |
| 2,415,812 | Cunningham | Feb. 18, 1947 |
| 2,557,035 | Lichty | June 12, 1951 |
| 2,597,729 | Homeyer | May 20, 1952 |